US006876986B1

(12) United States Patent
Currans et al.

(10) Patent No.: US 6,876,986 B1
(45) Date of Patent: Apr. 5, 2005

(54) TRANSACTION PAYMENT SYSTEM

(75) Inventors: Kevin G. Currans, Philomath, OR (US); Henry W. Sang, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 09/702,254

(22) Filed: Oct. 30, 2000

(51) Int. Cl.$^7$ .............................................. G06F 17/60
(52) U.S. Cl. ............................ 705/53; 705/54; 705/64
(58) Field of Search .................... 705/16–17, 26–27, 705/50–59, 63–64, 68–79, 39–44; 707/8–10, 104; 380/230–233

(56) References Cited

U.S. PATENT DOCUMENTS

| | | | |
|---|---|---|---|
| 5,319,562 A | | 6/1994 | Whitehouse ........... 364/464.03 |
| 5,606,613 A | | 2/1997 | Lee et al. ...................... 380/21 |
| 5,619,024 A | | 4/1997 | Kolls .......................... 235/381 |
| 5,629,980 A | * | 5/1997 | Stefik et al. .................... 380/4 |
| 5,812,991 A | | 9/1998 | Kara ........................... 705/410 |
| 5,903,721 A | * | 5/1999 | Sixtus .................... 395/187.01 |
| 6,005,945 A | | 12/1999 | Whitehouse ................. 380/51 |
| 6,026,166 A | * | 2/2000 | LeBorgeois .................. 380/25 |
| 6,529,880 B1 | * | 3/2003 | McKeen et al. ............. 705/17 |
| 6,574,609 B1 | * | 6/2003 | Downs et al. ................ 705/50 |
| 2003/0120557 A1 | * | 6/2003 | Evans et al. | |

FOREIGN PATENT DOCUMENTS

| | | | |
|---|---|---|---|
| EP | 0 567 800 | 11/1993 | |
| EP | 0 715 243 | 6/1996 | |
| WO | WO 95/34857 | * 12/1995 | ............. G06F/9/44 |
| WO | WO 00/46716 | 8/2000 | |
| WO | WO 99/60461 | 8/2001 | |

OTHER PUBLICATIONS

Allen, "Music Over the Net: The Next Big Thing in Electronic Commerce?", Jun. 1998, Telecommunications (Americas Edition) v32n6, pp s2–s5, ISSN: 0278–4831.*

* cited by examiner

*Primary Examiner*—James P. Trammell
*Assistant Examiner*—Mary Cheung
(74) *Attorney, Agent, or Firm*—Timothy F. Myers

(57) ABSTRACT

A system for the transaction of transactional amounts when using merchantable content on a medium includes a clearinghouse, an apparatus having a medium handier, a merchantable content receiver, a medium identifier, a content identifier, a medium use mechanism, and a transmitter. The medium handler accepts the medium and the merchantable content receiver accepts the merchantable content. The medium identifier reads a first identifier from the medium. The content identifier reads a second identifier from the merchantable content. The medium use mechanism incorporates and uses the merchantable content with the medium. The transmitter sends the first and second identifiers to the clearinghouse. The clearinghouse has a first account for a medium provider referenced by the first identifier and a second account for the content provider referenced by the second identifier. The clearinghouse further includes an account manager for transferring a royalty amount from the first account to the second account when the first and second identifiers are received.

21 Claims, 11 Drawing Sheets

TRANSACTION PAYMENT SYSTEM

FIELD OF THE INVENTION

The invention relates methods of performing transaction payment systems, in particular, the invention relates to exchanging a royalty payment for the use of privileged content.

BACKGROUND OF THE INVENTION

The Internet has caused explosive growth in the technological and business fields of the economy. By having individuals from around the world linked together in a common communication structure, access to news, pictures, books, music, video, and other multimedia content is readily available. However, this easy access is also creating tension between owners' and users of these multimedia content sources. Several court cases relating to "pirating" of MP3 songs or copies of movies have made headlines. The ease at which the multimedia content can be transferred between locations separated around the globe creates difficulty in enforcing current licensing schemes for using the multimedia content. Most contemporary licensing schemes require a user of the multimedia content to purchase a "bulk license" such that the transaction costs associated with the contractual bargaining in the licensing arraignment are minimized. This bulk licensing technique also has the disadvantage of requiring content creators and owners to join one or more associations of artists, writers, musicians, photographers, or other skilled artisan group to reduce the owner's transaction costs as well. By joining an association, the content provider (a creator or owner) is effectively left out of the marketing of their work. Thus, they are restricted to generally signing standard contracts that base the royalty compensation for their privileged content on the number of submittals to the association and not based on the quality of their work created. Due to the high transactions costs associated with bargaining between a user of the content and the content provider, optimum profit levels for the content provider can not be achieved. Therefore, a transaction payment system is required which allows the content provider and the user to minimize transaction costs, allows the user to get easy access to privileged content, and protects the content provider from piracy of their work.

SUMMARY

A system for the transaction of transactional amounts when using merchantable content on a medium includes a clearinghouse, an apparatus having a medium handler, a merchantable content receiver, a medium identifier, a content identifier, a medium use mechanism, and a transmitter. The medium handler accepts the medium and the merchantable content receiver accepts the merchantable content. The medium identifier reads a first identifier from the medium. The content identifier reads a second identifier from the merchantable content. The medium use mechanism incorporates and uses the merchantable content with the medium. The transmitter sends the first and second identifiers to the clearinghouse. The clearinghouse has a first account for a medium provider referenced by the first identifier and a second account for the content provider referenced by the second identifier. The clearinghouse further includes an account manager for transferring a royalty amount from the first account to the second account when the first and second identifiers are received.

DETAILED DESCRIPTION OF THE PREFERRED AND ALTERNATE EMBODIMENTS

Because content providers and/or artists do not have an easy way to accumulate fees for copyrighted or other privileged material, the invention allows for the exchanging of micro-payments, i.e. royalty amounts, through the use of consumable supplies whose cost pre-includes the micro-payment. A user prepays for the ability to use privileged content by purchasing special media that includes an identifier that indicates that a pre-payment amount has been collected during the sale of the media. The media is used with a medium use apparatus such as a printer, plotter, photoprinter, copier, scanner, MP3 player, e-book reader, or other multimedia device. This medium use apparatus allows for easy user or reproduction and also for authorization for the use or reproduction of the copyrighted or other privileged material. This approach reduces transaction costs because the pre-payment amount does not require a separate account for each user to be setup. In addition, if media without a proper identification were tried to be used to use privileged material with the content using apparatus, then optionally such an event is detected and reported the pirate to the content provider. In addition, the invention provides for a clearinghouse that contains accounts for both the medium providers and content providers. When privileged content is used, the medium use apparatus transmits the medium identifier and an identifier of the privileged content, preferably a key used for encryption, to the clearinghouse for reconciliation of payment from the media account to the content provider account. Optionally, the clearinghouse can also store the copies of different content providers' content and make it available to various users. Optionally, the users can obtain their privileged content directly from the content provider or other sources.

Figure 1:
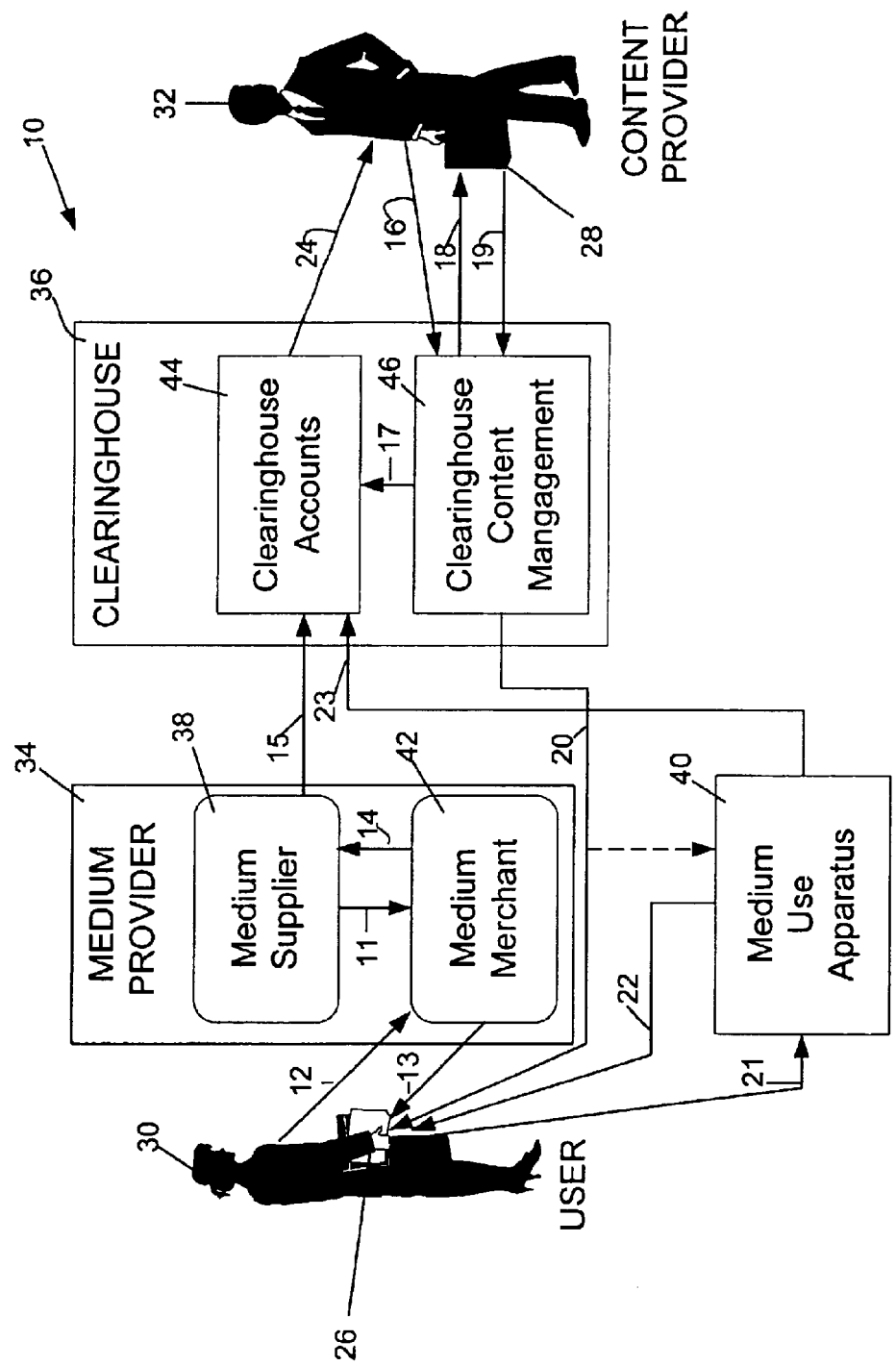
FIG. 1 is an exemplary block diagram illustrating the various interactions between parties and components in the invention.

FIG. 1 is an exemplary block diagram of the invention, a transaction payment system 10, which illustrates the various interactions among the components and parties using the invention. Medium provider 34 includes a medium supplier 38 and optionally a medium merchant 42. Medium provider 34 sells a medium 26, which incorporates a special identifier to medium merchant 42, such as a retailer, or a user 30. User 30 purchases the medium from the medium provider 34 by paying for the cost of the medium plus an additional charge that is a pre-payment for the right to use the medium 26 with privileged content that requires a royalty fee for its use. This additional charge is passed by the medium merchant 42, if used, to the medium supplier 38. Then, the medium supplier 38 sends this pre-payment amount to a clearinghouse 36 that provides a medium account referenced by the special identifier incorporated into the medium 26. Thus as medium sales are made, the media provider 34 transfers a portion of the sales price to the clearinghouse 46 for deposit into a medium account. Previously, concurrently, or subsequent to the medium sale, a content provider 32 creates, purchases, or acquires privileged content which he/she wishes to allow users to use, providing a royalty payment for its use is received. Content provider 32 requests an account from clearinghouse content management 46 that preferably is incorporated into clearinghouse 36 or optionally a separate entity such as a internet provider. Clearinghouse content management 46 requests an account be created for content provider 32 from clearinghouse accounts 44. Clearinghouse content management 46 then provides content provider 32 a "key" which preferably is a public encryption key but could be any unique identifier. Content provider 32 then incorporates the key with his/her privileged content, preferably by encrypting the privileged content with the key, to create a merchantable content 28. Preferably, the content provider 32 then provides the created merchantable content 28 to the clearinghouse content management 46 which further allows the content to be available to others. Optionally, other sources can make the content available to the user, including the content provider 32, itself. When a user 30 wishes to acquire the merchantable content 28, the user 30 directly, or indirectly, through a medium use apparatus, retrieves the merchantable content 28 from the clearinghouse content management 46. The user 30 then provides the medium 26 that incorporates the identifier to the medium use apparatus 40. The medium use apparatus 40 then uses the merchantable content 28 with the medium 26, such as by reproducing or copying the merchantable content 28, thereby incurring a royalty charge. The medium use apparatus 40 reads the identifier from the medium and the key from the merchantable content 28 and communicates these to clearinghouse accounts 44 of clearinghouse 36. The clearinghouse accounts 44 then transfers a royalty payment from an account represented by the identifier for the medium 26 to an account represented by the key,-a second identifier. The content provider 32 then can withdrawal the royalty charge from his/her account.

Specifically, the following steps are performed:

Step 11 represents the medium provider 34, either medium supplier 38 selling the medium 26 with an identifier either optionally to a medium merchant 42 or directly to a user 30. Step 12 represents the user purchasing the medium 26 either optionally through a medium merchant 42 or directly from medium supplier 38. The purchase price of the medium 26 includes a pre-payment amount, which represents a royalty charge for using the medium 26 with merchantable content 28. Step 13 represents the user 30 receiving the medium 26 from the medium provider 34. In step 15, the medium provider 34 sends the pre-payment amount to clearinghouse 36 along with the identifier that references an account for the medium 26. Through these steps, the medium provider 34, being either the medium supplier 38, the medium merchant 42, or a combination thereof, sells the medium 26 that has an identifier to a user to provide for the collection of transactional amounts incurred subsequently in using privilege content from merchantable content 28 with the medium 26. Step 14 is an optional step in which the medium supplier 38 confirms that medium merchant 42 has sold the medium before step 15 occurs.

Step 12 represents the user 30 purchasing the medium 26 that incorporates an identifier from the medium provider 34. When purchasing the medium 26 a prepayment amount is included in the purchase price paid by the user. Step 13 represents the user 30 receiving the medium 26 having the identifier. Step 20 represents the user 30 retrieving merchantable content 28 from the clearinghouse 36, although the user 30 may retrieve the merchantable content 28 indirectly from clearinghouse 36 by using the medium use apparatus 40 or receiving it from another party. Step 21 represents the user 30 providing the medium 26 with the identifier to the medium use apparatus 40 for incorporating the merchantable content 28 with the medium 26 such that a royalty payment is incurred. Step 23 represents the medium use apparatus 40 transmitting the key contained in the merchantable content 28 and the medium identifier to clearinghouse 36 to allow the transfer of the royalty payment from an account referenced by the identifier to an account reference by the key.

Step 16 represents the content provider 32 providing an identifier to a clearinghouse 36. Step 17 represents the clearinghouse 36 establishing an account reference by the identifier, or optionally a key that corresponds to the identifier. Step 18 represents the content provider 32 receiving a key, preferably for encryption of the privilege content but optionally for just combining with the privileged content to create merchantable content 28. Step 19 represents the content provider 32 making the merchantable content 28 available to others which wish to use it by supplying it to the clearinghouse 36. Optionally, the content provider 36 may make the merchantable content 28 available directly to the user 30 or by means of a third party.

Preferably, the medium 26 used is consumable so that the pre-payment amount can only be used once. However, optionally, the medium 26 is recyclable such that when the medium 26 is recycled, a second pre-payment amount is received from the user and transferred to the clearinghouse account referenced by the medium identifier. The medium26 used may be any from the class of consumable articles such as paper, vellum, film, mylar, audio tapes, video tapes, recordable compact discs (CD-R), mini-discs, zip disks, floppy disks, batteries, ink-jet print cartridges, toner cartridges, or print ribbons, to name a few. Preferably, the consumable article can only be used once with the merchantable content 28 such as by recording a JPEG photo on a printer page, or copying an MP3 audio file onto a programmable read-only-memory (PROM). However, once the merchantable content 28 is used with the medium, the combined medium 26 and merchantable content 28 can be enjoyed by the user multiple times. Optionally, the medium use apparatus 40 may prevent more than one use of the merchantable content 28. Preferably, it is the step of combining the merchantable content 28 with the medium 26 that only incurs the royalty charge.

Figure 2:
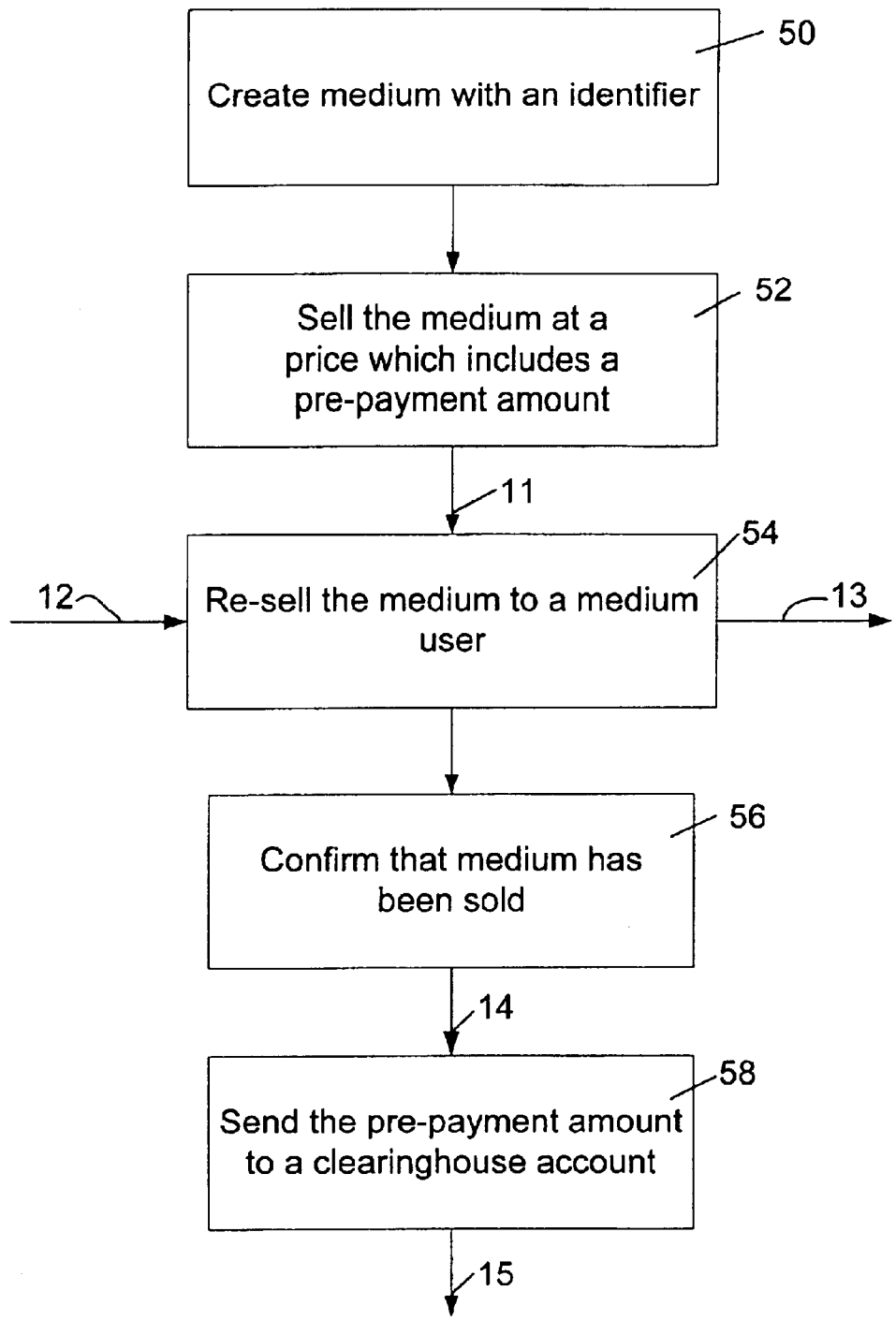
FIG. 2 is an exemplary flow chart illustrating the process performed by a medium provider.

FIG. 2 is an exemplary flow chart illustrating the steps performed by a merchant provider 34 in the transaction system 10 of FIG. 1 with respect to the exemplary block diagram shown in FIG. 1. In block 50, the medium provider 34 creates the medium with an identifier. Then in block 52, the medium provider 34 sells the medium at a price, which includes a pre-payment amount that represents step 11 from FIG. 1. In block 54, the medium provider optionally resells the medium to a medium user 30, represented by the step 12 of the user purchasing the medium and step 13 of the user receiving the medium. Optionally, in block 56, the medium provider 34 then confirms that the medium has been sold as represented by step 14. Once confirmed, in block 58, the medium provider 34 sends the prepayment amount to a clearinghouse account, which is referenced by the identifier as represented by step 15.

Figure 3:
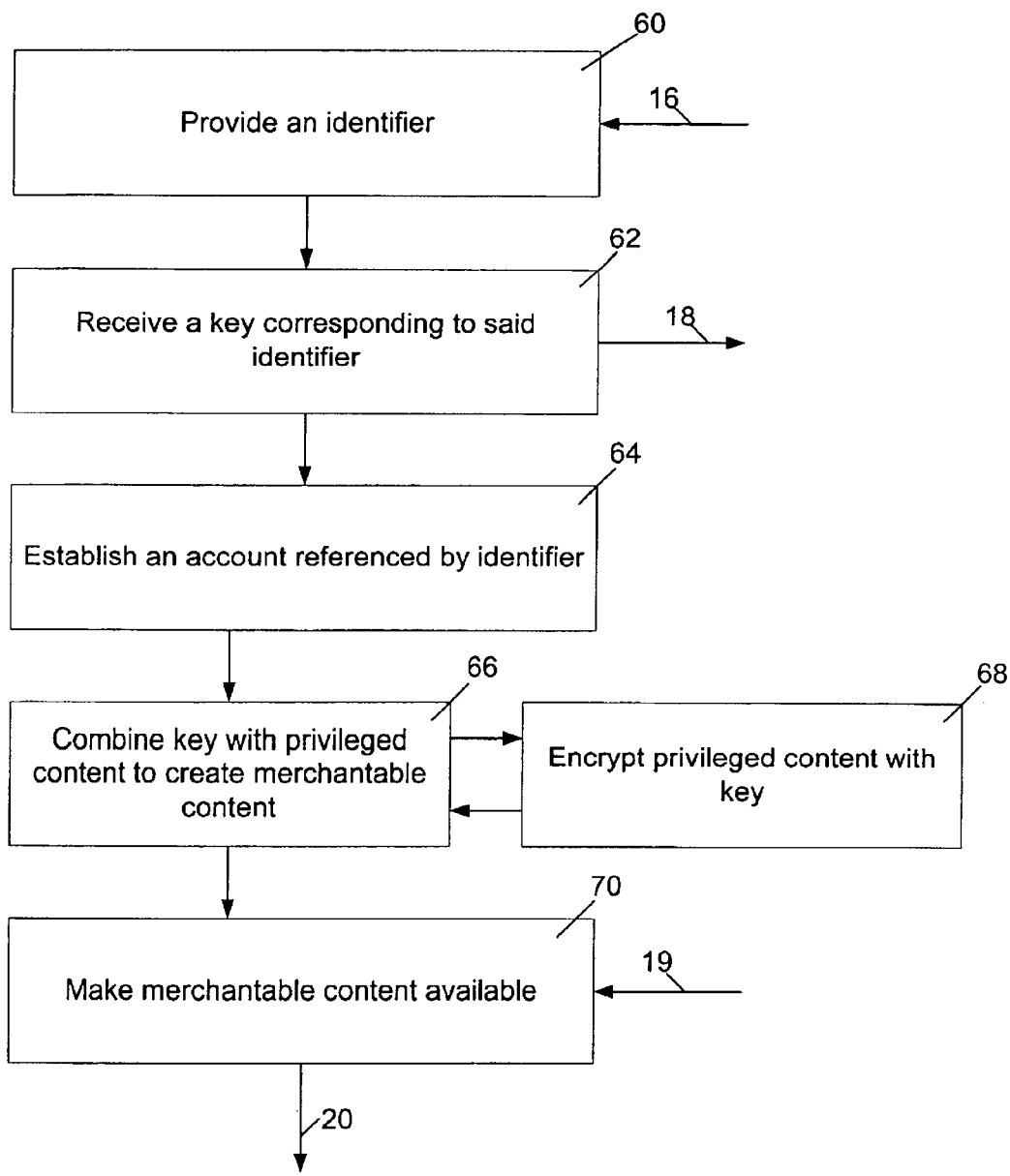
FIG. 3 is an exemplary flow chart illustrating one process preformed by a clearinghouse.

FIG. 3 is an exemplary flow chart illustrating a process performed by a content provider 32 in the transaction payment system 10 of FIG. 1. In block 60, the content provider 32 provides an identifier to clearinghouse 36 as represented by step 16. In block 62, the clearinghouse 36 provides a key corresponding to the identifier to the content provider 32 as represented by step 18. In block 64, the content provider 32 then establishes an account referenced by the identifier directly or indirectly by the key. In block 66, the content provider 32 combines the key with privileged content thereby creating merchantable content. Preferably, the key is used to encrypt the privileged content in block 68 such that unauthorized users cannot use the merchantable content without using the transactional payment system 10. In block 70, the content provider 32 makes the merchantable content available to the clearinghouse 36, represented by step 19, for further availability to user 30 or other wishing to use the merchantable content as represented by step 20.

Figure 4:
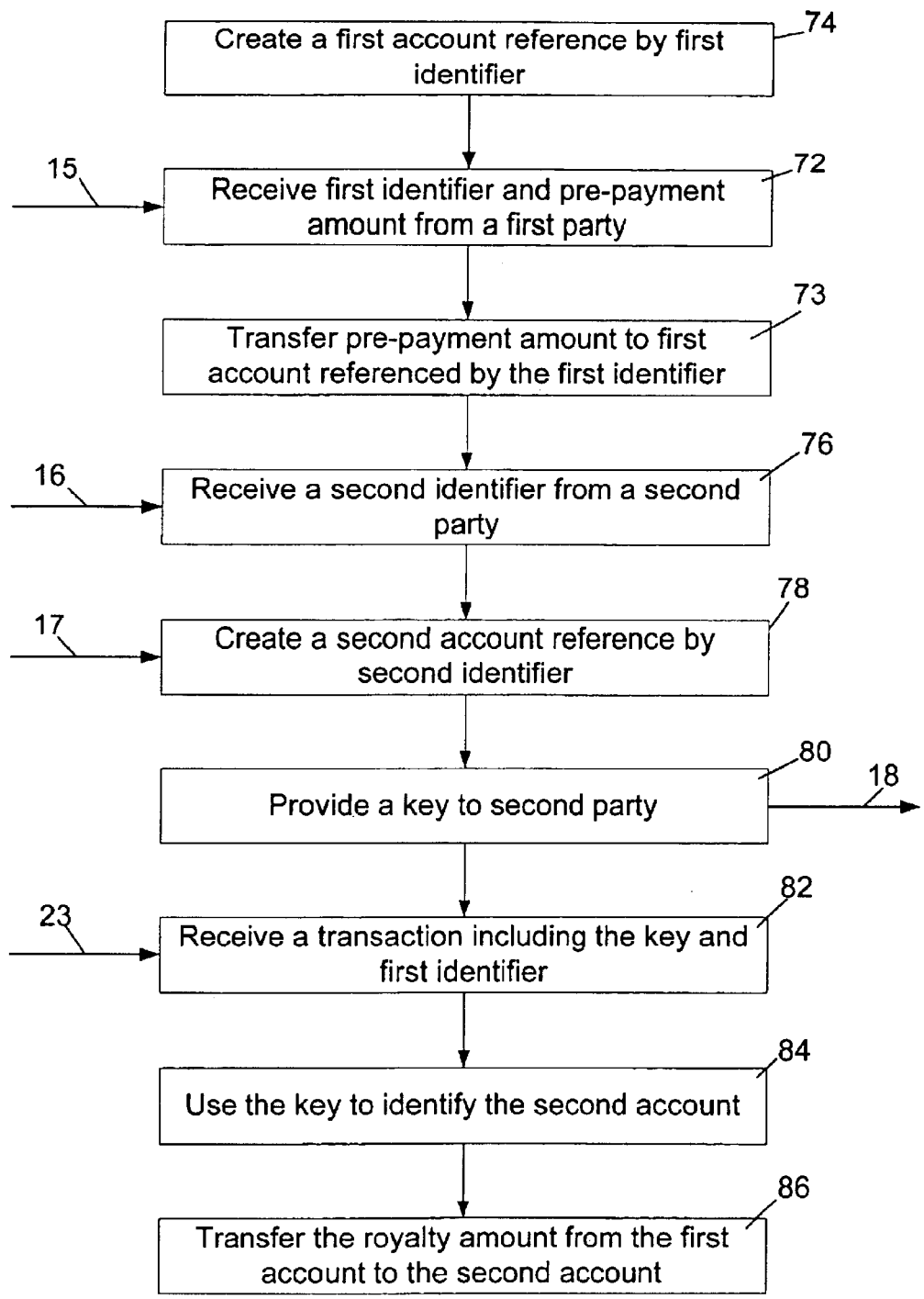
FIG. 4 is an exemplary flow chart illustrating a second process performed by a clearinghouse.

FIG. 4 is an exemplary flow chart illustrating a process performed by a clearinghouse 36 in the transaction payment system 10 of FIG. 1. In block 74, a first account is created referenced by a first identifier. As represented by step 15, the clearinghouse 36 in block 72 receives the first identifier and a pre-payment amount from a first party, the medium provider 34. In block 73, the clearinghouse 36 transfers the pre-payment amount into the first account referenced by the first identifier. In block 76, the clearinghouse 36 receives a second identifier from a second party, the content provider 32, as represented by step 16. In block 78, the clearinghouse 36 creates a second account referenced by the second identifier as represented by step 17. The clearinghouse 36 in block 80 provides a unique key, preferably a public encryption key known to those skilled in the art, to the content provider, as represented by step 18. In block 82, the clearinghouse 36 receives a transaction from a medium use apparatus 40, as represented by step 23. The transaction contains the key and first identifier. The clearinghouse 36 then uses the key to look up the second identifier, which is used to reference the second account in block 84. Then in block 86, the clearinghouse 36 transfers a pre-determined royalty amount from the first account to the second account.

Figure 5:
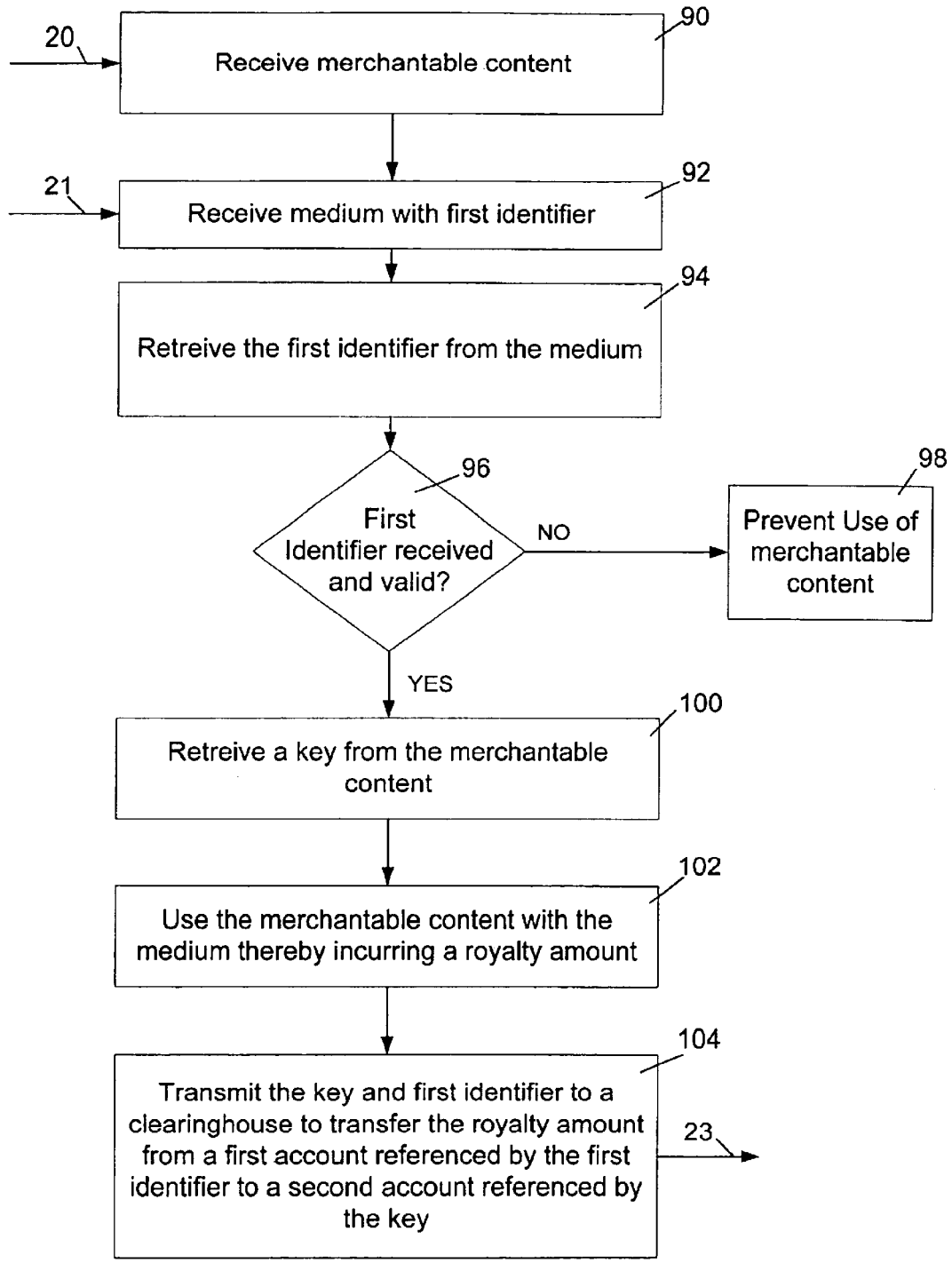
FIG. 5 is an exemplary flow chart illustrating a process used by a medium use apparatus.

FIG. 5 is an exemplary flow chart illustrating a process used by a medium use apparatus 40 in the transaction payment system of FIG. 1. As represented by step 20, the medium use apparatus 40 receives the merchantable content in block 90 from either the user 30 or directly from the clearinghouse 36 based on user 30 commands. The user 30 may also receive the merchantable content directly from the clearinghouse 36, the content provider 32 directly, or from another source before supplying the merchantable content to the medium use apparatus 40. In block 92, as represented by step 21, the user 30 provides and the medium use apparatus 40 receives the medium having a first identifier. In block 94, the medium use apparatus retrieves the first identifier from the medium. Then in block 96, a check is optionally performed to verify that the first identifier was actually received and valid. If not received or invalid, the in block 98, the medium use apparatus 40 prevents the use of the merchantable content with the medium. If the first identifier was received and valid then the medium use apparatus retrieves a key from the merchantable content in block 100. In block 102, the medium use device uses the merchantable content with the medium by incorporating the two together and thereby incurring a royalty charge amount. As referenced by step 23 in FIG. 1, the medium use apparatus transmits the key and first identifier to clearinghouse 36 in block 104. This transmission causes the clearinghouse 36 to transfer the royalty amount from a first account referenced by the first identifier to a second account referenced by the key.

Figure 6:
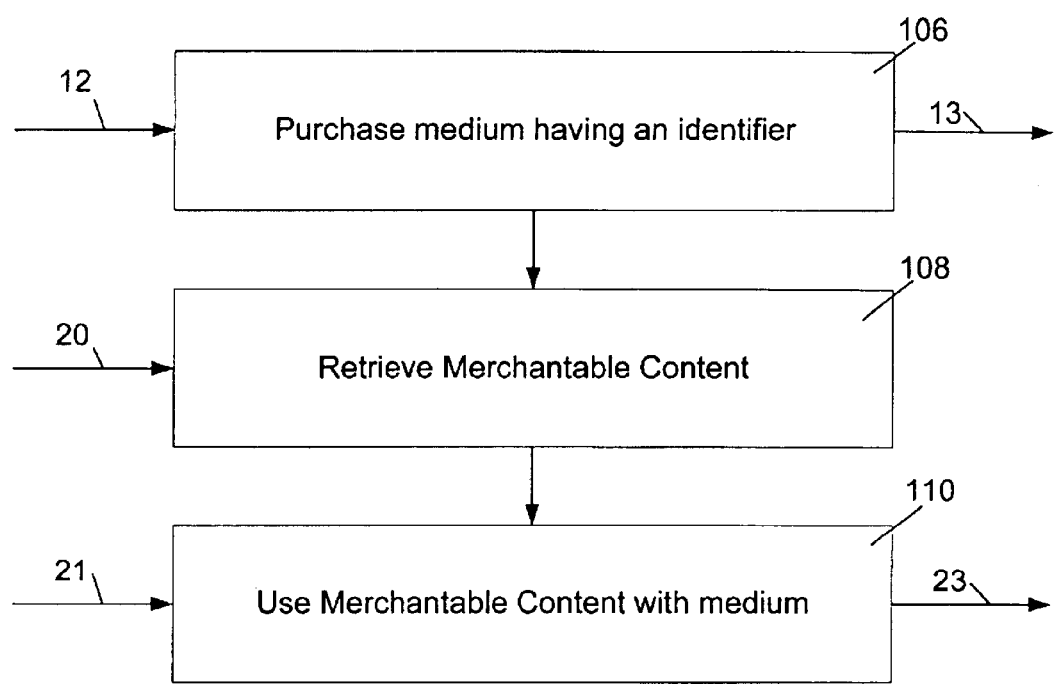
FIG. 6 is an exemplary flow chart illustrating a process performed by user of the media.

FIG. 6 is an exemplary flow chart illustrating a process performed by user 30 of the medium within the transaction payment system 10 of FIG. 1. As referenced by step 12, the user 30 purchases the medium that includes an identifier in block 106. Step 13 references the user 30 receiving the medium as in FIG. 1. In block 108, the user 30 preferably retrieves the merchantable content having a key from the clearinghouse 36 as referenced by step 20. Optionally, the user 30 can retrieve the merchantable content directly from the content provider 32 or from another source such as an Internet provider web site. In block 110, the user 30 uses the merchantable content with the medium with medium use apparatus 40 by providing the medium to the medium use apparatus as in step 21. As referenced in step 23, the use of the medium with the merchantable content causes a transmission of the key and identifier to the clearinghouse 36 whereby a royalty payment is transferred from a first account referenced by the identifier to a second account referenced by the key.

Figure 7:
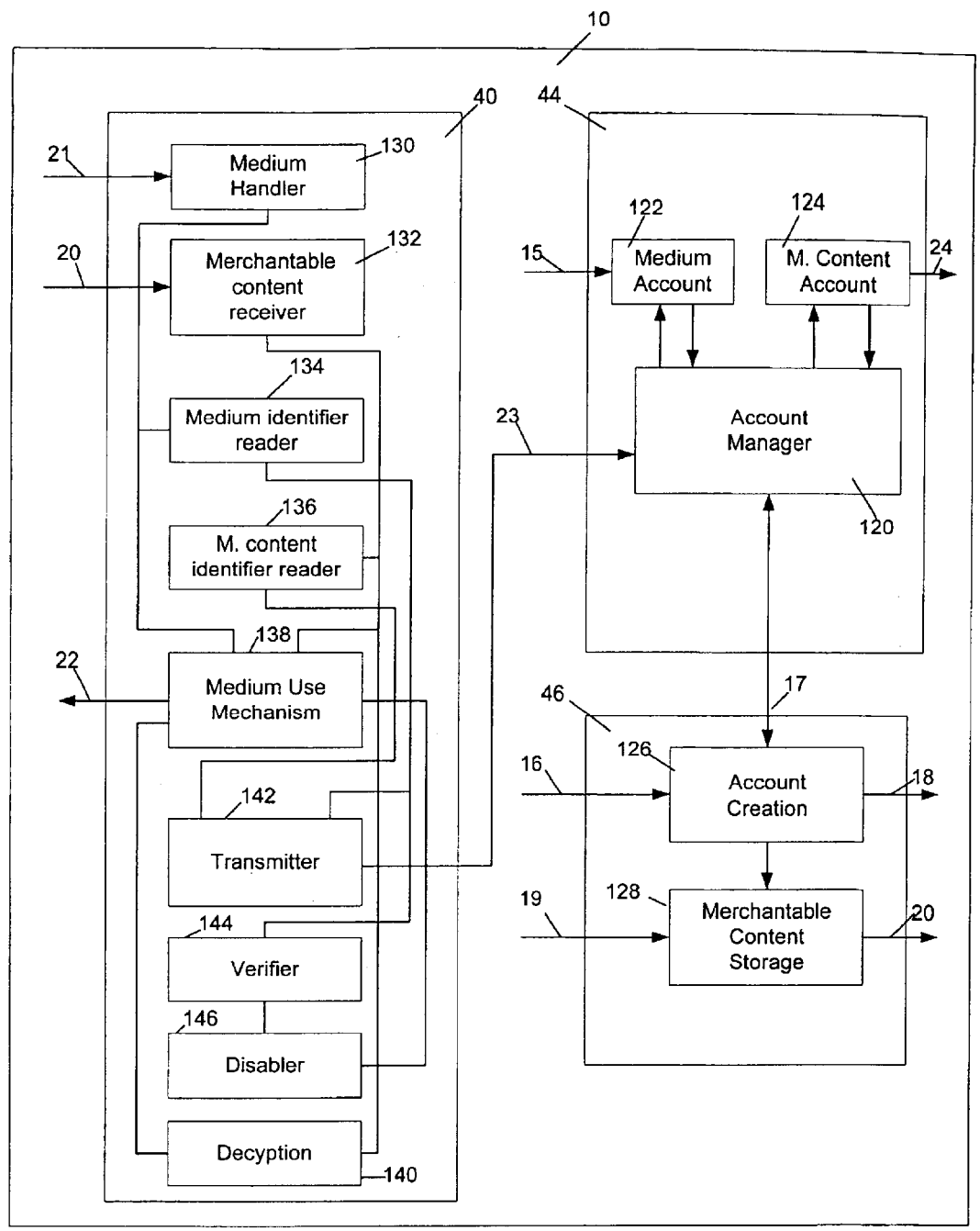
FIG. 7 is an exemplary block diagram illustrating the interconnection of component blocks for various parts of the invention.

FIG. 7 is an exemplary block diagram illustrating the component blocks of various parts of the transaction payment system 10 as illustrated in FIG. 1. The clearinghouse accounts 44 within clearinghouse 36 (FIG. 1) include a medium account 122 and a merchantable content account 124 that are under the control of an account manager 120, which can transfer funds to, from, and between the accounts. The medium account 122 is referenced to step 15 of FIG. 1. The merchantable content account 124 is referenced to step 24. The account manager 120 interfaces the clearinghouse account 44 to clearinghouse content management 46 as referenced by step 17. The clearinghouse content management 46, which can also be kept separately from the clearinghouse, includes an account creation block 126 and a merchantable content storage block 128. The account creation block 126 requests from the account manager 120 to create accounts for the medium and the merchantable content. The account creation block also creates a unique key, which is delivered to the content provider 32 to incorporate with his/her privileged content as referenced in step 18. Further, the account creation block 126 requests storage area in merchantable content storage block 128 to allow for the content provider 32 to store, as referenced by step 19, and make available merchantable content to user 30 as referenced in step 20.

Medium use apparatus 40 includes a medium handler 130 for accepting and receiving the medium having an identifier from user 30, as referenced by step 21. The rmedium handler 130 is coupled to a medium identifier reader 134 and a medium use mechanism 138. The medium identifier reader 134 is used to read the identifier from the medium and provide it to a transmitter circuit 142 and a verifier circuit 144 that determines if the identifier was read and valid. The verifier circuit 144 is coupled to a disable circuit 146 that is further coupled to the medium use mechanism 138. The medium use mechanism 138 incorporates the merchantable content with the medium thereby using the merchantable content and incurring a royalty charge. As referenced by step 20, the merchantable content is received from the merchantable content receiver 132 that is coupled to the medium use mechanism 138. The merchantable content receiver 132 receives the merchantable content either from the user 30 or directly from the clearinghouse 36. If the identifier from the medium is not verified as present or is invalid, then the disable circuit 146 prevents the medium use mechanism 138 from using the merchantable content with the medium. The output of the merchantable content mechanism is represented by step 22 in which the user 30 enjoys use of the privileged content incorporated with the media.

The merchantable content receiver 132 is also coupled to a merchantable content identifier reader circuit 136 which retrieves the key from the merchantable content and passes the key to optionally included decryption circuit 140 and medium use mechanism 138 which use the key to decrypt the merchantable content to recover the privileged content.

Figure 8:
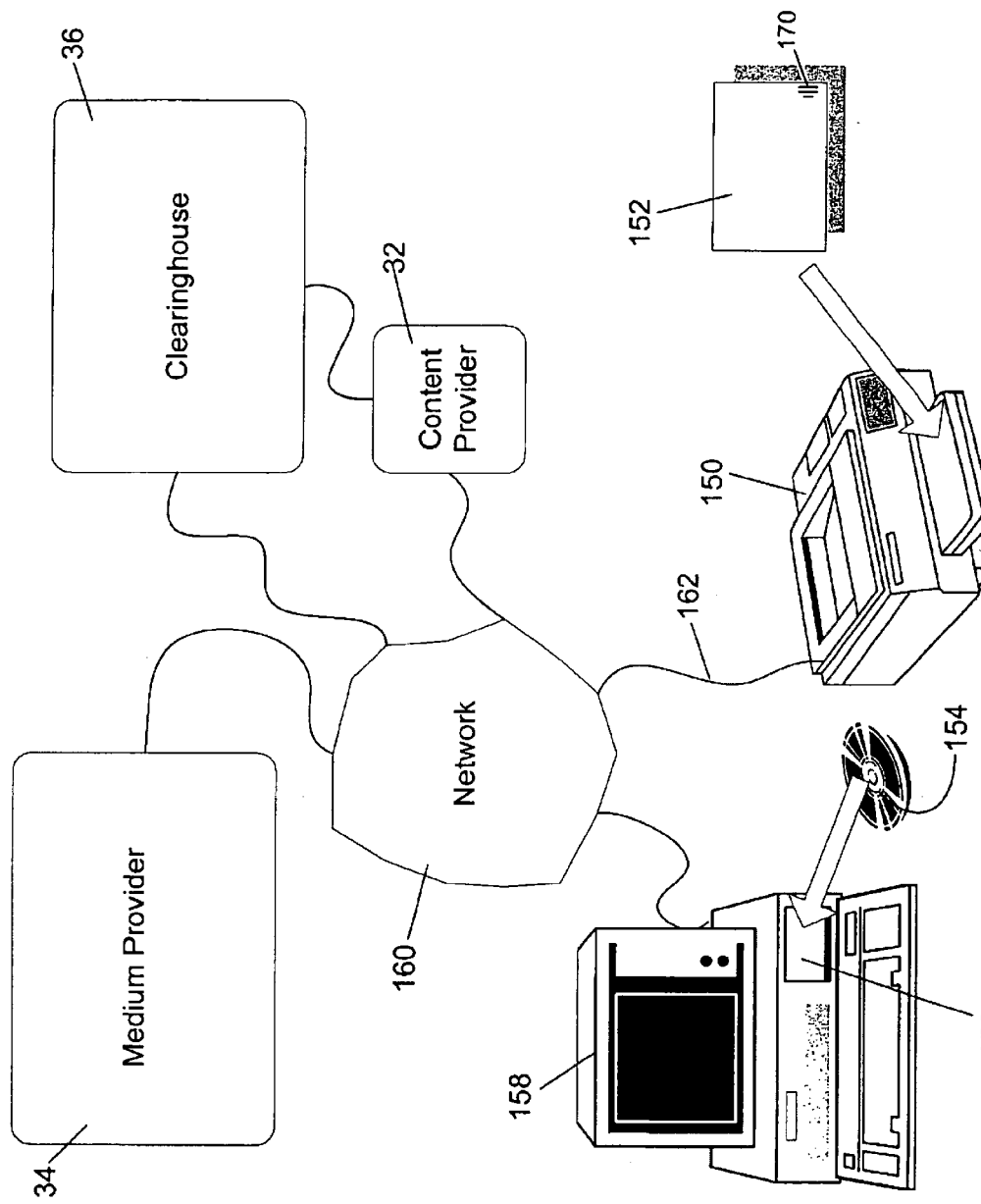
FIG. 8 is a first exemplary embodiment of the invention utilizing a printer as the medium use apparatus.

FIG. 8 is a first exemplary embodiment of the invention utilizing a printer 150 as the medium use apparatus and paper 152 as the medium. Alternatively, the medium use apparatus can be the combination of device 158, a personal computer, and printer 150. In this embodiment a user purchases the medium having an identifier from a medium provider 34 wherein the purchase price includes a pre-payment amount. This pre-payment amount is sent to an account at clearinghouse 36 using a network 160, such as the Internet. The content provider 32, has previously set up an account with clearinghouse 36 either directly or via using the network 160 and received a key. The content provider 32 also either directly or via use of the network 160 provides merchantable content, which incorporates his/her privileged content with the key, to the clearinghouse 36. A user using a device 158, such as a personal computer, retrieves the merchantable content from the clearinghouse 36 or optionally, directly from content provider 32. Optionally, the user may acquire the merchantable content from another source such as a CD-ROM 154 read by a CD player 156. The merchantable content, such as a JPEG file, is sent to the printer 150 over a communication link 162 for use with paper 152. Communication link 162 is preferably a direct network connection to the network 160, or alternatively it could be a direct connection to device 158 through which the printer 150 communicates. The printer 150 incorporates an identifier circuit (not shown) that verifies that the paper 152 being used has been purchased and a pre-payment amount reserved for payment for the use of the merchantable content. When the printer 150 has completed using the merchantable content with the paper 152, the printer 150 sends the key from the merchantable content, and the identifier from the paper 152 to the clearinghouse 36 over network 160 such that a royalty amount is transferred from an account for the paper to an account for the merchantable content.

Figure 9:
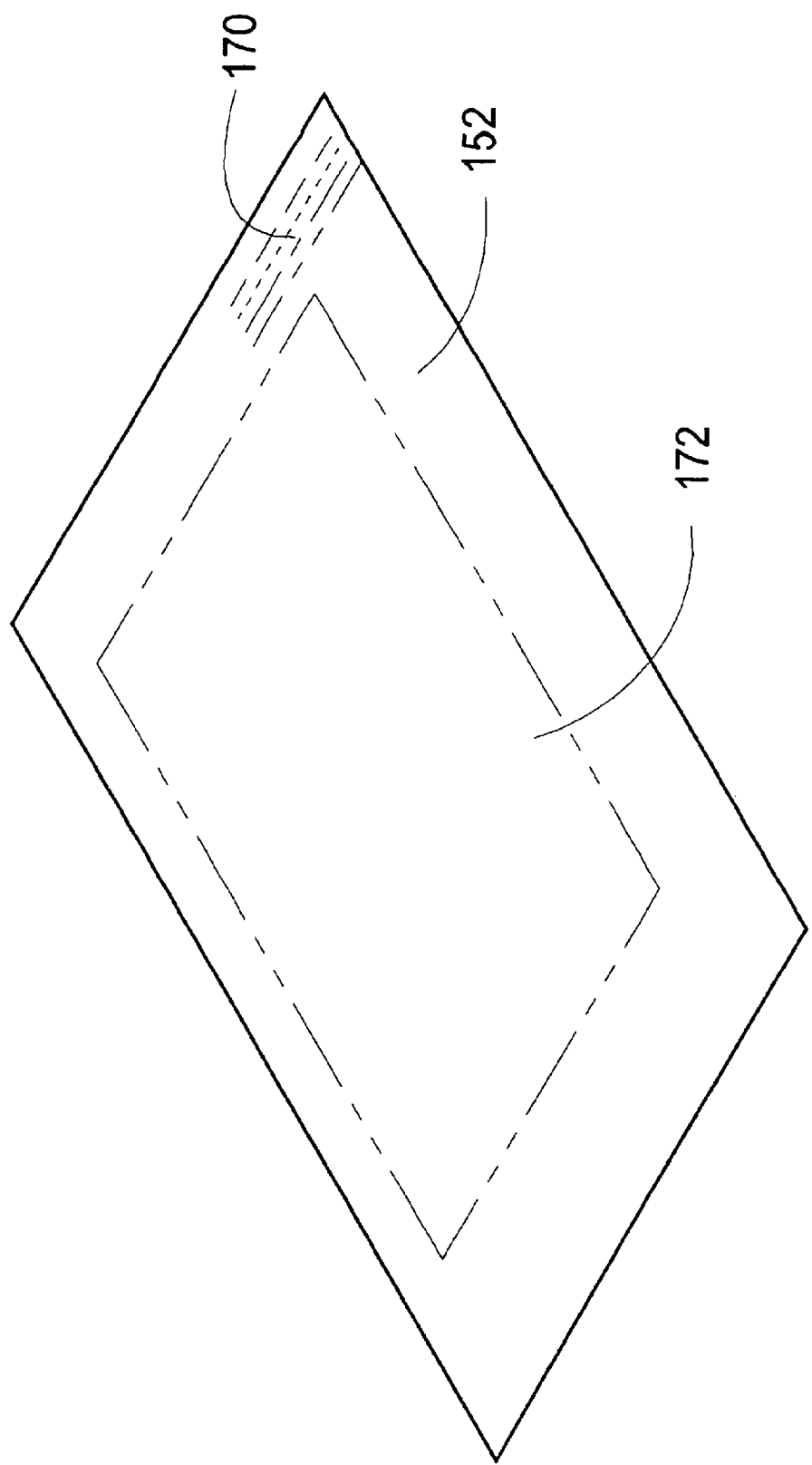
FIG. 9 is an illustration of an exemplary medium used with the invention in the embodiment of FIG. 8.

FIG. 9 is an illustration of an exemplary medium used with the embodiment of FIG. 8. Paper 152 includes an identifier 170, such as a barcode, magnetic strip, watermark, optically recognizable characters, or equivalent identifier, several of which are known to those skilled in the art. Paper 152 after use with the printer 150 includes a rendition 172 of the privileged content, such as a photo if the merchantable content was a JPEG photo.

Figure 10:
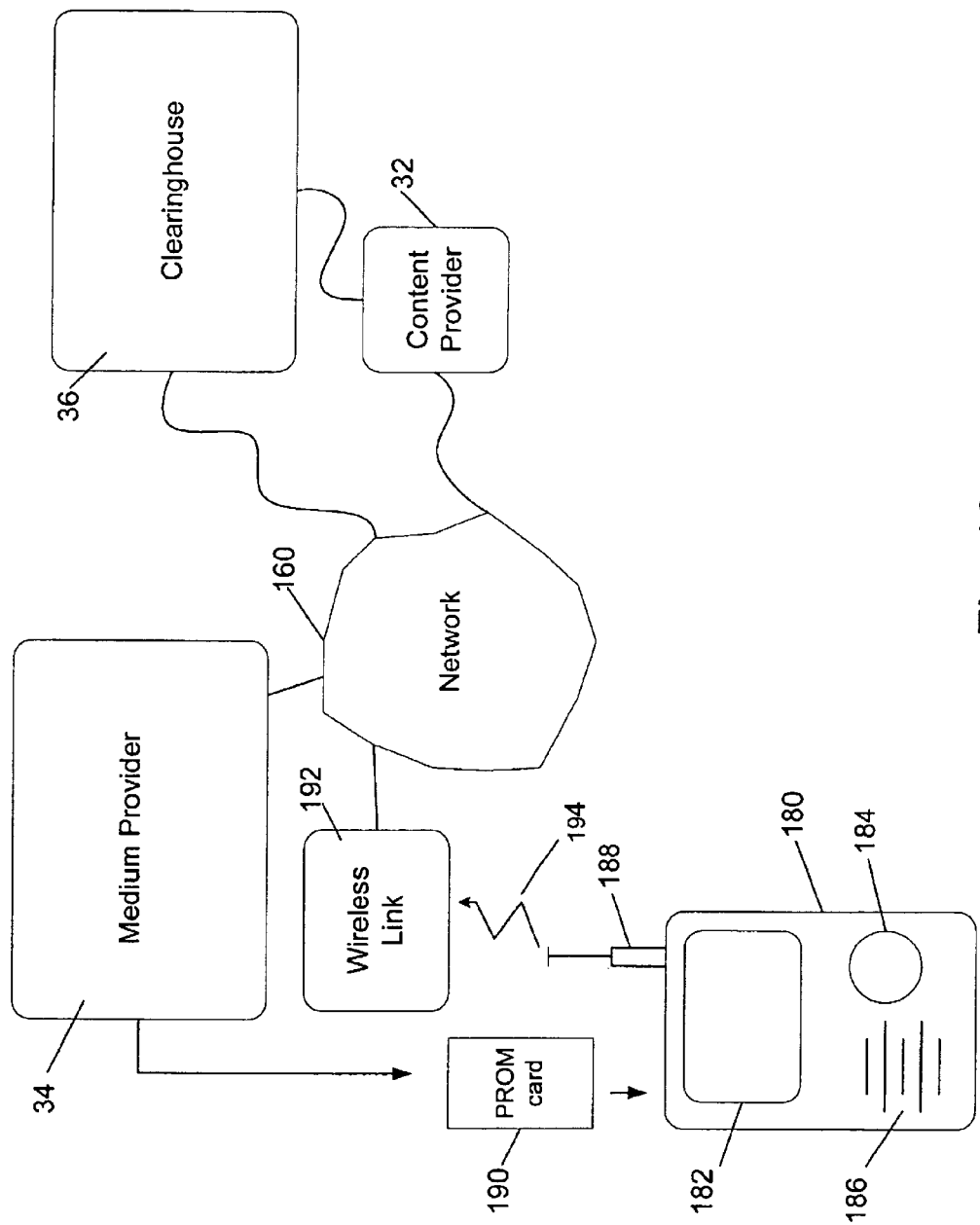
FIG. 10 is a second exemplary embodiment of the invention utilizing an MP3 player as the medium use apparatus.

FIG. 10 is a second exemplary embodiment of the invention utilizing an MP3 player 180 as the medium use apparatus and a programmable read only memory (PROM) card 190 as the medium having an identifier. In this embodiment, the medium provider 34 sells the PROM card 190 to a user for a purchase price, which includes a pre-payment amount. The pre-payment amount is sent over network 160, such as the Internet, to clearinghouse 36 to a pre-established account. The PROM card 190 can be programmed by the MP3 player or optionally be pre-programmed by the medium provider. Also the PROM card may contain one or more privileged content sources depending on the amount of pre-payment amount charged. The MP3 player 180 shown includes an exemplary screen 182, a speaker for playback and enjoyment use of the privileged content and a control knob 184 for selecting which privileged content to play and for adjusting volume settings. In this exemplary embodiment, the MP3 player 180 is connected to the network 160 via a wireless link 192. Preferably the wireless link is bi-directional. Wireless signals 194 are sent and received by antenna 188. If the medium provider 34 has pre-programmed the PROM card, the medium provider 34 transmits the identifier and the keys for the merchantable content directly to the clearinghouse 36 using network 160, preferably the Internet In this situation, the wireless link 192 and antenna 188 are not required on MP3 player 180. However, if the user of MP3 player 180 wishes to download privileged content from either clearinghouse 36 or content provider 32 over network 160, then preferably a wireless link is used to allow for mobile freedom. Several conventional wireless links are known to those skilled in the art and as such can be used to implement the wireless link. Such known wireless links include cellular networks, CDPD networks, bluetooth network, infrared, and wireless Internet networks.

Figure 11:
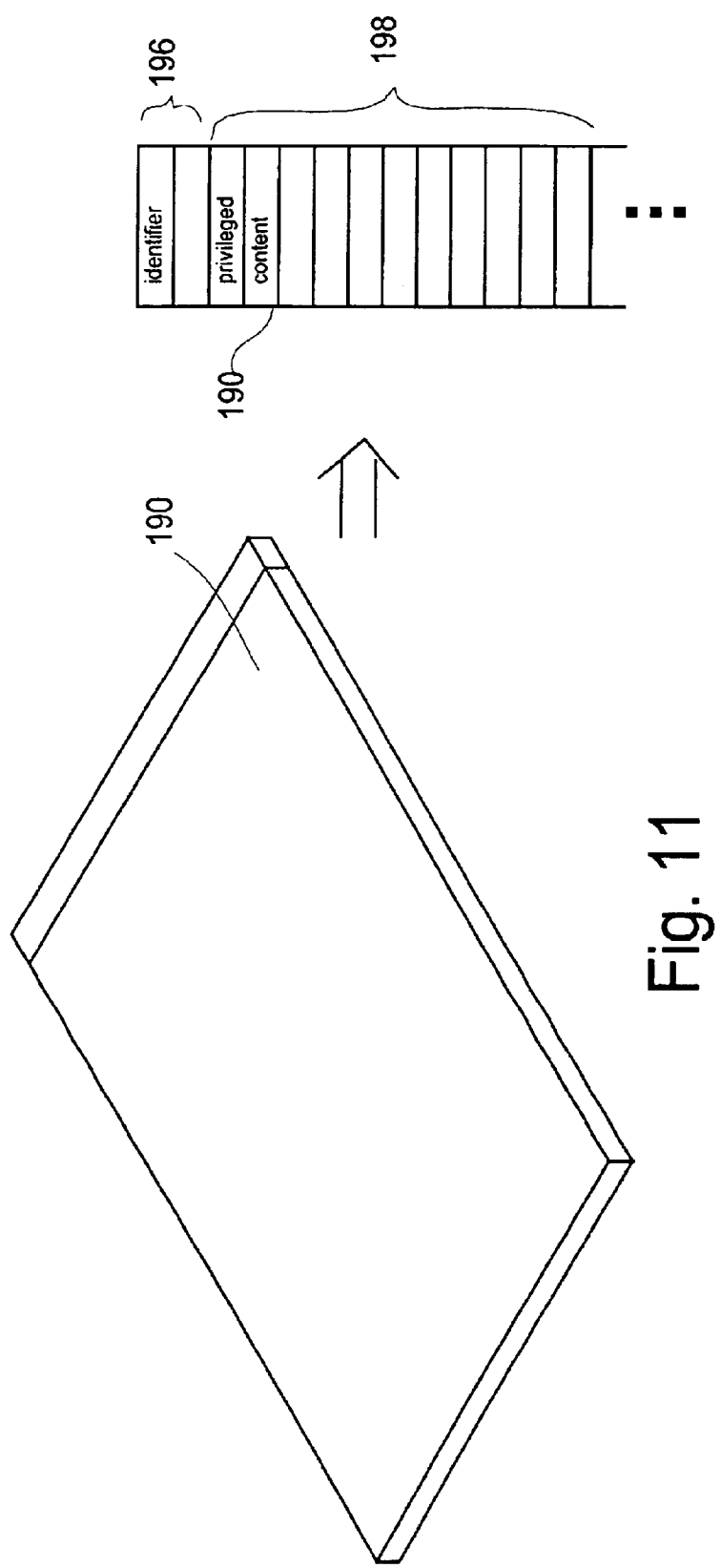
FIG. 11 is an illustration of an exemplary medium used with the invention in the embodiment of FIG. 10.

FIG. 11 is an illustration of an exemplary organization for a medium PROM card 190 used with the embodiment of FIG. 10. PROM card 190, such as a PCMCIA, PC-CARD, smartcard, compact flash, and other memory card known to those skilled in the art, contains a data structure of computer readable memory which contains a header 196 and at least one MP3 file 198 which represents the privileged content. Header 196 includes at least one identifier, preferably the key, for the medium PROM card 190. Together, the identifier and privileged content combined form the merchantable content. Alternatively, when the identifier is a key, the key may be used to encrypt the privileged content and incorporated within it.

Optionally, when using the merchantable content with the medium, an optional step can be performed within to also incorporate a confirmational mark with the medium to allow the user, the content provider, the clearinghouse, and others to confirm that the content provider has been compensated for the use of the priveledged content.

What is claimed is:

1. A method of providing for the collection of royalty payments for privileged content, comprising the steps of:

electronically providing an first identifier and a royalty amount to a clearinghouse to establish a first account referenced by said first identifier;

electronically receiving a key which corresponds to said first identifier;

electronically combining said key with the privileged content thereby creating a merchantable content; and electronically making the merchantable content available to at least one other person wherein when the merchantable content is used on a medium, the key and a second identifier identifying the medium are provided to the clearinghouse and wherein the clearinghouse using the key to identify the first account and the royalty amount transfers a quantity of money equal to the royalty amount from a second account referenced by said second identifier to said first account.

2. The method of claim 1 wherein the step of combining said key with the privileged content includes the step of encrypting said privilege content with said key to create said merchantable content.

3. A method of providing merchantable content having privileged content and a key to a user of the merchantable content, comprising the steps of:

providing a directory of merchantable content containing at least one merchantable content source to the user; and allowing the user to download said at least one merchantable content source wherein said key represents first identifier for an account for the owner of the privilege content such that use of the merchantable content on a medium causes a second identifier for an account for the medium to be transferred to a clearinghouse to allow a royalty payment to be transferred from the account for the medium to said account for the owner of the privilege content.

4. A method of providing a clearinghouse for the exchange of transactional amounts, comprising the steps of:

electronically receiving a first identifier for a medium from a first party;

electronically creating an first account for the first party referenced by said first identifier;

electronically receiving a second identifier from a second party and a royalty amount representing the cost of using a privileged content;

electronically creating a second account for said second party referenced by said second identifier;

electronically providing a key to said second party;

electronically receiving a transaction including the key and said first identifier when the medium is used with the privileged content;

electronically using said key to identify said second account; and electronically transferring the royalty amount from said first account to said second account.

5. A method of using a merchantable content, comprising the steps of:

electronically receiving the merchantable content;

electronically retrieving a first identifier from a medium that references the medium;

electronically using said merchantable content with said medium wherein the payment of a royalty amount is incurred by the use of the merchantable content;

electronically retrieving a key from said merchantable content; and electronically transmitting said key and said first identifier to a clearinghouse wherein the royalty amount is transferred from a first account referenced by said first identifier to a second account referenced by said key.

6. The method of claim 5 further comprising the steps of:

determining that a valid first identifier is received; and if not received, then preventing the step of using said merchantable content.

7. A method of using merchantable content having a key, comprising the steps of:

purchasing medium having a first identifier, wherein the purchase price includes a pre-payment amount;

electronically retrieving the merchantable content;

using the merchantable content with the medium wherein a royalty payment is incurred, and wherein the use of the merchantable content causes the electronically transmission of the key and the first identifier to a clearinghouse where the royalty payment is transferred from a first account referenced by the first identifier to a second account reference by the key.

8. A system for the transaction of transactional amounts, comprising:

an apparatus for using a merchantable content with a medium, said apparatus including,
a medium handler capable of accepting the medium,
a merchantable content receiver capable of accepting the merchantable content,
a medium identifier coupled to said medium handler capable of reading a first identifier from the medium,
a content identifier coupled to said merchantable content receiver capable of reading a second identifier from the merchantable content,
a medium use mechanism capable of using the merchantable content with the medium, and
a transmitter coupled to said medium identifier and said content identifier capable of transmitting sending first and second identifiers; and a clearinghouse coupled to said transmitter, said clearinghouse including,
a first account for a medium provider,
a second account for a content provider, and
an account manager capable of transferring a royalty amount from said first account to said second account.

9. The system of claim 8 wherein said transmitter includes circuitry capable of using the Internet.

10. The system of claim 8 wherein said transmitter includes circuitry using a wireless communication link.

11. The system of claim 8 wherein said apparatus further includes:

a verifier circuit coupled to said medium identifier, said verifier capable of detecting that said first identifier is received; and a disabler circuit coupled to said verifier circuit and said medium use mechanism wherein if said first identifier is not received said disabler circuit is capable of preventing said medium use mechanism from operating.

12. The system of claim 8, wherein said medium use mechanism includes a decryption circuit coupled to said merchantable content receiver and said merchantable identifier capable of decrypting the merchantable content with said second identifier before using the merchantable content with the medium.

13. An apparatus for automatic payment of royalties incurred when using a merchantable content with a medium, comprising:

a medium handler capable of accepting the medium;

a merchantable content receiver capable of accepting the merchantable content;

a medium identifier coupled to said medium handler capable of reading a first identifier from the medium;

a content identifier coupled to said merchantable content receiver capable of reading a second identifier from the merchantable content;

a medium use mechanism capable of using the merchantable content with the medium; and a transmitter coupled to said medium identifier and said content identifier capable of transmitting sending first and second identifiers to a clearinghouse wherein a royalty amount for using said merchantable content is transferred from a first account referenced by said first identifier to a second account referenced by said second identifier.

14. The apparatus of claim 13, further comprising:
a verifier circuit coupled to said medium identifier, said verifier capable of detecting that said first identifier is received; and
a disabler circuit coupled to said verifier circuit and said medium use mechanism wherein if said first identifier is not received said disabler circuit is capable of preventing said medium use mechanism from operating.

15. The apparatus of claim 13, wherein said medium use mechanism includes a decryption circuit coupled to said merchantable content receiver and said merchantable identifier capable of decrypting the merchantable content with said second identifier before using the merchantable content with the medium.

16. The apparatus of claim 13 wherein said apparatus is a device from the group consisting of computers, printers, plotters, video cassette recorders, cassette players, MP3 players, compact disk players, floppy drives, zip drives, and fax machines.

17. A method of providing for the collection of royalty payments for privileged content, comprising the steps of:
providing an first identifier and a royalty amount over a network to a clearinghouse to establish a first account referenced by said first identifier;
receiving a key over the network which corresponds to said first identifier;
combining said key with the privileged content thereby creating a merchantable content; and
making the merchantable content available to at least one other person wherein when the merchantable content is used on a medium, the key and a second identifier identifying the medium are provided to the clearinghouse over the network and wherein the clearinghouse using the key to identify the first account and the royalty amount transfers a quantity of money equal to the royalty amount from a second account referenced by said second identifier to said first account.

18. A program product for providing a clearinghouse for the exchange of transactional amounts, the program product comprising machine readable program code for executing the steps of:
receiving a first identifier for a medium from a first party;
creating an first account for the first party referenced by said first identifier;
receiving a second identifier from a second party and a royalty amount representing the cost of using a privileged content;
creating a second account for said second party referenced by said second identifier;
providing a key to said second party;
receiving a transaction including the key and said first identifier when the medium is used with the privileged content;
using said key to identify said second account; and
transferring the royalty amount from said first account to said second account.

19. A method of using a merchantable content, comprising the steps of:
receiving the merchantable content over a network;
retrieving a first identifier from a medium that references the medium;
using said merchantable content with said medium wherein the payment of a royalty amount is incurred by the use of the merchantable content;
retrieving a key from said merchantable content; and
transmitting said key and said first identifier to a clearinghouse over the network wherein the royalty amount is transferred from a first account referenced by said first identifier to a second account referenced by said key.

20. The method of claim 19 further comprising the steps of:
determining that a valid first identifier is received; and
if not received, then preventing the step of using said merchantable content.

21. A method of using merchantable content having a key, comprising the steps of:
purchasing medium having a first identifier, wherein the purchase price includes a prepayment amount;
retrieving the merchantable content over a network; and
using the merchantable content with the medium wherein a royalty payment is incurred, and wherein the use of the merchantable content causes the transmission of the key and the first identifier over the network to a clearinghouse where the royalty payment is transferred from a first account referenced by the first identifier to a second account reference by the key.

* * * * *